United States Patent
Yang et al.

(10) Patent No.: US 10,745,605 B2
(45) Date of Patent: Aug. 18, 2020

(54) PLUGGING AGENT FOR TEMPERATURE-RESISTANT CALCIUM-RESISTANT WATER-BASED DRILLING FLUID USED IN OIL AND GAS RESERVOIR PROTECTION, DRILLING FLUID, AND USES THEREOF

(71) Applicants: CNPC Engineering Technology R&D Company Limited, Beijing (CN); China University of Petroleum (East China), Qingdao (CN)

(72) Inventors: Yuping Yang, Beijing (CN); Jingping Liu, Qingdao (CN); Long Li, Beijing (CN); Dongyang Li, Beijing (CN); Wei Zhang, Beijing (CN); Lei Guo, Beijing (CN); Lulu Li, Beijing (CN)

(73) Assignees: CNPC ENGINEERING TECHNOLOGY R&D COMPANY LIMITED, Beijing (CN); CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 16/196,399

(22) Filed: Nov. 20, 2018

(65) Prior Publication Data

US 2020/0115611 A1 Apr. 16, 2020

(30) Foreign Application Priority Data

Oct. 15, 2018 (CN) .......................... 2018 1 1196149

(51) Int. Cl.
| | | |
|---|---|---|
| *E21B 21/00* | (2006.01) | |
| *C09K 8/24* | (2006.01) | |
| *C01B 32/194* | (2017.01) | |
| *C08F 226/04* | (2006.01) | |
| *E21B 21/06* | (2006.01) | |
| *B82Y 30/00* | (2011.01) | |
| *B82Y 40/00* | (2011.01) | |

(52) U.S. Cl.
CPC .............. *C09K 8/24* (2013.01); *C01B 32/194* (2017.08); *C08F 226/04* (2013.01); *E21B 21/003* (2013.01); *E21B 21/062* (2013.01); *B82Y 30/00* (2013.01); *B82Y 40/00* (2013.01); *C08F 2800/10* (2013.01); *C08F 2810/00* (2013.01); *C09K 2208/10* (2013.01)

(58) Field of Classification Search
CPC .... C09K 8/24; C09K 2208/10; C01B 32/194; C08F 226/04; C08F 2800/10; E21B 21/003; E21B 21/062; B82Y 30/00; B82Y 40/00
See application file for complete search history.

(56) References Cited

U.S. PATENT DOCUMENTS

| | | | |
|---|---|---|---|
| 9,318,231 B2* | 4/2016 | Ku ............................ | C09C 1/44 |
| 9,528,066 B2* | 12/2016 | Sui ........................ | C10M 125/02 |
| 2013/0156678 A1* | 6/2013 | Banerjee ................ | B82Y 30/00 |
| | | | 423/445 R |

* cited by examiner

*Primary Examiner* — Silvana C Runyan
(74) *Attorney, Agent, or Firm* — Volpe and Koenig, P.C.

(57) ABSTRACT

The present invention relates to the technical field of well drilling, and discloses a plugging agent for temperature-resistant calcium-resistant water-based drilling fluid used in oil and gas reservoir protection, a drilling fluid, and uses of the plugging agent and the drilling fluid. The plugging agent for temperature-resistant calcium-resistant water-based drilling fluid used in oil and gas reservoir protection contains acrylamide-diallyldimethylammonium chloride copolymer modified graphene, wherein in the acrylamide-diallyldimethylammonium chloride copolymer, a molar ratio of structural units provided by acrylamide to structural units provided by diallyldimethylammonium chloride is 1:5-15, and the number-average molecular weight of the acrylamide-diallyldimethylammonium chloride copolymer is 15,000-30,000. The water-based drilling fluid described in the present invention is especially applicable to well drilling in deep salt-gypsum formations, and can exhibit good filtrate reducing, plugging, temperature-resistant, anti-collapsing, and reservoir protection performance.

19 Claims, No Drawings

PLUGGING AGENT FOR TEMPERATURE-RESISTANT CALCIUM-RESISTANT WATER-BASED DRILLING FLUID USED IN OIL AND GAS RESERVOIR PROTECTION, DRILLING FLUID, AND USES THEREOF

CROSS REFERENCE TO RELATED APPLICATIONS

This application claims priority to Chinese Application No. 201811196149.6, filed on Oct. 15, 2018, which is incorporated herein by reference as if fully set forth.

FIELD

The present invention relates to the technical field of well drilling, particularly to a plugging agent for temperature-resistant calcium-resistant water-based drilling fluid used in oil and gas reservoir protection, a drilling fluid, and uses of the plugging agent and the drilling fluid.

BACKGROUND

As strategic resources, petroleum and natural gas have significant influences on economic security and stable development of a country. As the demand for petroleum and natural gas is increasing rapidly and the shallow oil and gas resources are depleted increasingly in China, the dependence of economic and industrial growth in China on foreign trade of petroleum is increased continuously. Facing the serious situation of energy resources, China is in urgent need for new superseding oil and gas resources. According to the result of the second run of national oil and gas resource assessment, the total quantity of oil resources is 94 billion tons, the total quantity of conventional gas resources is 38 trillion cubic meters, and the remaining oil and gas resources are mainly distributed in deep strata. Most deep reservoirs in China are deeper than 5,000 m, the deepest reservoirs are in depth of about 9,000 m presently, the downhole temperature is 180-260° C., and massive salt-gypsum formations exist in most regions. At present, ultra-deep well drilling is carried out in Daqing, South China Sea, Jilin, Xinjiang, Tarim, Dagang and other oilfields. Drilling fluids that are resistant to ultra-high temperature and high calcium ($CaCl_2 \geq 1\%$) are the key to successful drilling in deep salt-gypsum formations. However, the existing drilling fluids can't meet the requirements for resistance to ultra-high temperature and reservoir protection under the condition of massive salt-gypsum formations. A series of severe technical difficulties incurred by drilling fluid failure at high temperatures, such as well wall collapsing, jamming of drilling tools, well blowout, and reservoir contamination, etc., are encountered in drilling engineering. In deep well drilling, drilling fluid failure at high temperatures may result in difficulties in cuttings carrying, suspension of weighting materials, and effective support of the well wall, and may cause severe safety accidents such as well caving, jamming of drilling tools, well blowout, etc., even lead to abandonment of the well. At present, in the use of water-based drilling fluids in drilling of ultra-high temperature wells that involve salt-gypsum formations, the performance of the drilling fluids is maintained mainly by increasing the dosage of treating chemicals. Such an approach not only involves high cost, heavy consumption of treating chemicals and frequent treatment, but also results in complex drilling accidents, severe reservoir contamination, low drilling rate, long drilling cycle, production safety and public safety risks, and has severe impacts on drilling quality, drilling rate and benefits, and even affects the attainment of geological objectives.

Therefore, it is of great practical significance to make research on plugging agents for temperature-resistant calcium-resistant water-based drilling fluids used in oil and gas reservoir protection and drilling fluids that have such properties.

SUMMARY

To overcome the drawback that existing water-based drilling fluids are inapplicable to drilling processes in high-temperature high-calcium deep salt-gypsum formations, the present invention provides a plugging agent for temperature-resistant calcium-resistant oil and gas reservoir protective water-based drilling fluid, a drilling fluid, and applications of the filtrate reducer and the drilling fluid.

To attain the object described above, the present invention provide a method for preparing acrylamide-diallyldimethyl-ammonium chloride copolymer modified graphene comprising: dispersing graphene oxide by ultrasonic dispersion in water to obtain a dispersion, and making the dispersion react with acrylamide-diallyldimethylammonium chloride copolymer and hydrazine hydrate, wherein in the acrylamide-diallyldimethylammonium chloride copolymer, the molar ratio of structural units provided by acrylamide to structural units provided by diallyldimethylammonium chloride is 1:(5-15), preferably is 1:(8-10); the number-average molecular weight of the acrylamide-diallyldimethylammonium chloride copolymer is 15,000-30,000, preferably is 18,000-25,000.

The present invention further provides an acrylamide-diallyldimethylammonium chloride copolymer modified graphene prepared with the method described above.

The present invention further provides a use of the acrylamide-diallyldimethylammonium chloride copolymer modified graphene described above as a plugging agent used in a water-based drilling fluid.

The present invention further provides a water-based drilling fluid containing the acrylamide-diallyldimethylammonium chloride copolymer modified graphene described above as a plugging agent.

Preferably, in the water-based drilling fluid, the content of the acrylamide-diallyldimethylammonium chloride copolymer modified graphene is 0.3-3 wt %.

The present invention further provides a use of the water-based drilling fluid described above in well drilling in a gas reservoir having high-temperature and high-calcium oil.

The acrylamide-diallyldimethylammonium chloride copolymer modified graphene plugging agent described in the present invention has excellent high-temperature plugging, filtrate reducing, and reservoir protection capabilities. The reasons mainly lie in: 1. the hydrophilic acrylamide-diallyldimethylammonium chloride copolymer chain segments on the modified graphene material contain amino groups, which have a strong ability to inhibit clay mineral expansion and dispersion; 2. the modified graphene material kneads the rigidity, dimensional stability and thermal stability of graphene with the properties of acrylamide-diallyldimethylammonium chloride copolymer seamlessly, so as to significantly improve plugging and dispersion performance of graphene on the basis of the original excellent properties of graphene; thus, when the modified graphene material is used as a plugging agent used in a drilling fluid, it attains significant plugging and filtrate loss reduction effects in a high-temperature and high-calcium environment, and thereby inhibits infiltration of free water in the drilling fluid into the reservoir and protects the reservoir free from the damages of the drilling fluid.

The plugging agent for water-based drilling fluid described in the present invention is especially applicable to the well drilling in deep salt-gypsum formations, and can exhibit excellent filtrate reducing, plugging, high temperature-resistant, anti-collapsing, and reservoir protection performance.

DETAILED DESCRIPTION OF THE EMBODIMENTS

Hereunder some embodiments of the present invention will be detailed. It should be understood that the embodiments described here are only provided to describe and explain the present invention, but shall not be deemed as constituting any limitation to the present invention.

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined with each other to obtain one or more new numeric ranges, which shall be deemed as having been disclosed specifically in this document.

The present invention provides a method for preparing acrylamide-diallyldimethylammonium chloride copolymer modified graphene comprising: dispersing graphene oxide by ultrasonic dispersion in water to obtain a dispersion, and making the dispersion react with acrylamide-diallyldimethylammonium chloride copolymer and hydrazine hydrate.

In the method described in the present invention, in the acrylamide-diallyldimethylammonium chloride copolymer, the molar ratio of structural units provided by acrylamide to structural units provided by diallyldimethylammonium chloride is 1:(5-15); specifically, for example, the molar ratio may be 1:5, 1:6, 1:7, 1:8, 1:9, 1:10, 1:11, 1:12, 1:13, 1:14, 1:15, or any value within a range constituted by any two of those point values. Preferably, the molar ratio of structural units provided by acrylamide to structural units provided by diallyldimethylammonium chloride is 1:(8-10).

In the method described in the present invention, in the acrylamide-diallyldimethylammonium chloride copolymer, the number-average molecular weight of the acrylamide-diallyldimethylammonium chloride copolymer is 15,000-30,000, preferably is 16,000-28,000, more preferably is 18,000-25,000. In the present invention, the "number-average molecular weight" is measured by means of gel permeation chromatography (GPC) (the laboratory instrument is a GPC Model E2695 from Waters Corporation (a US company)).

In the method described in the present invention, the weight ratio of the graphene oxide to the acrylamide-diallyldimethylammonium chloride copolymer to the hydrazine hydrate may be 1:(4.8-5.3):(60-80), preferably 1:(4.9-5.2):(65-76), more preferably 1:(5-5.1):(68-73).

In the method described in the present invention, the concentration of the graphene oxide in the dispersion may be 0.5-2.2 mg/mL, preferably 1-2 mg/mL.

In the method described in the present invention, the acrylamide-diallyldimethylammonium chloride copolymer preferably is added in a form of solution. The concentration of the acrylamide-diallyldimethylammonium chloride copolymer solution may be 0.4-0.6 wt %, preferably 0.45-0.55 wt %, more preferably 0.5-0.52 wt %.

In the method described in the present invention, preferably, the process of the reaction of the dispersion with the acrylamide-diallyldimethylammonium chloride copolymer and the hydrazine hydrate comprises: firstly adding the acrylamide-diallyldimethylammonium chloride copolymer in a form of solution into the dispersion and stirring for 15-50 min (preferably 20-40 min), and then adding the hydrazine hydrate to obtain a mixture, and keeping the mixture in a constant temperature water bath of 65-95° C. (preferably 70-90° C.) to react for 1-10 h (preferably 2-5 h).

In the present invention, the method for preparing the acrylamide-diallyldimethylammonium chloride copolymer modified graphene preferably further comprises: preparing graphene oxide according to the following procedures:

mixing graphite powder with $NaNO_3$ to obtain a mixture, then in an ice water bath adding concentrated $H_2SO_4$ into the mixture while stirring, next adding $KM_NO_4$ and stirring the mixture at a temperature equal to or lower than 4° C. for reaction, then increasing the water bath temperature to 30-45° C. and holding at the temperature for a thermostatic reaction, next adding water dropwise into the obtained mixture and increasing the water bath temperature to 90-100° C. for further reaction, finally adding water to dilute the mixture, adding $H_2O_2$ and hydrochloric acid into the mixture after the temperature of the mixture drops to 60° C. or lower, and stirring for reaction, washing the reaction product with water by centrifugal washing till the pH of the solution is neutral after the reaction is finished, and then drying the reaction product.

In the preparation process of the graphene oxide, the mass ratio of $KMnO_4$ to $NaNO_3$ to the graphite powder may be (2.8-3.5):(0.8-1.3):1, preferably is (2.9-3.3):(0.9-1.2):1, further preferably is (3-3.2):(1-1.1):1.

In the preparation process of the graphene oxide, the dose ratio of the graphite powder to the concentrated $H_2SO_4$ may be 1 g:(20-27.5) mL, preferably 1 g:(21.5-26.5) mL, more preferably 1 g:(22.5-25.5) mL. In the present invention, the concentrate $H_2SO_4$ refers to $H_2SO_4$ water solution at a concentration equal to or higher than 70 wt % (e.g., 70-90 wt %).

In the preparation process of the graphene oxide, the dose ratio of the graphite powder to $H_2O_2$ may be 1 g:(4.5-5.6) mL, preferably 1 g:(4.8-5.5) mL, further preferably is 1 g:(5-5.3) mL.

According to a preferred embodiment of the present invention, the synthesis process of the acrylamide-diallyldimethylammonium chloride copolymer modified graphene comprises the following steps:

(1) mixing graphite powder with $NaNO_3$ to obtain a mixture, then in an ice water bath adding concentrated $H_2SO_4$ into the mixture and stirring for 0.5-1.5 h, next adding $KMnO_4$ into the obtained mixture and stirring the mixture at a temperature equal to or lower than 4° C. for 0.5-5 h for reaction, then increasing the water bath temperature to 30-45° C. and holding at the temperature for 1.5-6 h for thermostatic reaction, next adding water dropwise into the obtained mixture and increasing the water bath temperature to 90-100° C. and holding at the temperature for 0.5-5 h for further reaction, finally adding water to dilute the mixture, adding $H_2O_2$ and hydrochloric acid into the mixture after the temperature of the mixture drops to 60° C. or lower, and stirring for 10-60 min for reaction, washing the reaction product with water by centrifugal washing till the pH of the solution is neutral after the reaction is finished, and then drying the reaction product by vacuum drying at 40-65° C., to obtain graphene oxide;

(2) dispersing graphene oxide by ultrasonic dispersion in water to prepare 0.5-2.2 mg/mL dispersion; adding 0.4-0.6 wt % acrylamide-diallyldimethylammonium chloride copolymer solution into the dispersion and stirring for 15-50 min, and then adding hydrazine hydrate to obtain a mixture, and keeping the mixture in a constant temperature water bath of 65-95° C. to react for 1-10 h; separating the reaction product by centrifugal separation, washing the reaction product with water, and then drying the reaction product by vacuum drying at 40-65° C., to obtain acrylamide-diallyldimethylammonium chloride copolymer modified graphene.

The present invention further provides an acrylamide-diallyldimethylammonium chloride copolymer modified graphene prepared by the method described above.

The present invention further provides a use of the acrylamide-diallyldimethylammonium chloride copolymer modified graphene described above as a plugging agent used in a water-based drilling fluid.

The present invention further provides a water-based drilling fluid that contains the acrylamide-diallyldimethylammonium chloride copolymer modified graphene described above as a plugging agent.

In the water-based drilling fluid, the acrylamide-diallyldimethylammonium chloride copolymer modified graphene is applied as a filtrate reducer in the water-based drilling fluid, so that the water-based drilling fluid can still attain significant plugging and filtrate loss reduction effects even in a high-temperature and high-calcium environment, and thereby inhibits infiltration of free water in the drilling fluid into the reservoir and protects the reservoir free from damages of the drilling fluid. There is no particular restriction on the content of the acrylamide-diallyldimethylammonium chloride copolymer modified graphene in the present invention, which is to say, a conventional dose of plugging agent used in a water-based drilling fluid may be used; of course, the content may be adjusted appropriately according to the conditions of different wells; preferably, the content of the acrylamide-diallyldimethylammonium chloride copolymer modified graphene is 0.1-5 wt %, preferably is 0.3-3 wt % (based on the total weight of the water-based drilling fluid).

The water-based drilling fluid may further contain other additives commonly used in water-based drilling fluids, besides water and the above-mentioned copolymer. Preferably, the other additives are selected from bentonite, amine inhibitor, sulfomethylated phenolic resin, polyethylene glycol, graphite, polyanionic cellulose (PAC), KCl, and $Na_2CO_3$.

Wherein, the bentonite refers to clay with montmorillonite as the main mineral component, which can render viscous shearing strength, filter loss wall building property to the drilling fluid; for example, the bentonite may be sodium bentonite and calcium bentonite, preferably is sodium bentonite. More preferably, the content of the bentonite is 1-4 wt %, and even more preferably is 2-3 wt %.

Wherein, the content of the amine inhibitor may be 1-3 wt %; the content of the sulfomethylated phenolic resin may be 2-4 wt %; the content of the polyethylene glycol may be 2-7 wt %; the content of the polyanionic cellulose may be 0.5-3 wt %; the content of the potassium chloride may be 0.5-3 wt %; the content of the sodium carbonate may be 0.1-0.5 wt %.

The above additives may be commercially available products, or may be prepared with conventional methods in the art. They will not be further detailed hereunder.

The present invention further provides a use of the water-based drilling fluid described above in well drilling in high-temperature high-calcium oil and gas reservoirs. The permeability in high-temperature and high-calcium oil and gas reservoirs is 100-900 millidarcy.

Hereunder the present invention will be detailed in some examples, but it should be noted that the present invention is not limited to those examples.

Example 1

(1) Preparation of Graphene Oxide 1 g graphite powder is mixed with 1 g $NaNO_3$ to obtain a mixture, then in an ice water bath 22.5 mL concentrated $H_2SO_4$ is added into the mixture and the mixture is stirred in an ice water bath, next 3 g $KMnO_4$ is added into the obtained mixture and the mixture is stirred at a temperature equal to or lower than 4° C. for 2 h for reaction, then the water bath temperature is increased to 35° C. and held at the temperature for 3 h for thermostatic reaction, next 45 mL water is added dropwise into the obtained mixture and the water bath temperature is increased to 90° C. and held at the temperature for 2 h for further reaction, finally 200 mL water is added to dilute the mixture, 5 mL $H_2O_2$ and 200 mL 5 wt % hydrochloric acid are added into the mixture after the temperature of the mixture drops to 60° C. or lower, and the mixture is stirred for 30 min for reaction, the reaction product is washed with water by centrifugal washing till the pH of the solution is neutral after the reaction is finished, and then the reaction product is dried by vacuum drying at 60° C., to obtain graphene oxide.

(2) Preparation of Modified Graphene 0.03 g graphene oxide obtained above is dispersed by ultrasonic dispersion in water to prepare 1 mg/mL dispersion; 30 mL 0.5 wt % solution of acrylamide-diallyldimethylammonium chloride copolymer (the number-average molecular weight is 20,000, and the molar ratio of structural unit provided by acrylamide to structural units provided by diallyldimethylammonium chloride is 1:9) is added into the dispersion, the obtained mixture is stirred for 30 min, and then 2 mL hydrazine hydrate is added into the mixture, and the mixture is kept in a constant temperature water bath of 80° C. for 3 h for reaction. The reaction product is separated by centrifugal separation, washed with water, and then dried by vacuum drying at 60° C., to obtain acrylamide-diallyldimethylammonium chloride copolymer modified graphene A1.

Example 2

(1) Preparation of Graphene Oxide 1 g graphite powder is mixed with 1.2 g $NaNO_3$ to obtain a mixture, then in an ice water bath 27.5 mL concentrated $H_2SO_4$ is added into the mixture and the mixture is stirred, next 2.8 g $KMnO_4$ is added into the obtained mixture and the mixture is stirred at a temperature equal to or lower than 4° C. for 5 h for reaction, then the water bath temperature is increased to 30° C. and held at the temperature for 6 h for thermostatic reaction, next 45 mL water is added dropwise into the obtained mixture and the water bath temperature is increased to 98° C. and held at the temperature for 0.5 h for further reaction, finally 180 mL water is added to dilute the mixture, 5.5 mL $H_2O_2$ and 220 mL 4 wt % hydrochloric acid are added into the mixture after the temperature of the mixture drops to 60° C. or lower, and the mixture is stirred for 50 min for reaction, the reaction product is washed with water by centrifugal washing till the pH of the solution is neutral after the reaction is finished, and then the reaction product is dried by vacuum drying at 65° C., to obtain graphene oxide.

(2) Preparation of Modified Graphene 0.03 g graphene oxide obtained above is dispersed by ultrasonic dispersion in water to prepare 2 mg/mL dispersion; 35 mL 0.48 wt % solution of acrylamide-diallyldimethylammonium chloride copolymer (the number-average molecular weight is 25,000, and the molar ratio of structural unit provided by acrylamide to structural units provided by diallyldimethylammonium chloride is 1:10) is added into the dispersion, the obtained mixture is stirred for 15 min, and then 2.1 mL hydrazine hydrate is added into the mixture, and the mixture is kept in a constant temperature water bath of 95° C. for 1 h for reaction. The reaction product is separated by centrifugal separation, washed with water, and then dried by vacuum drying at 40° C., to obtain acrylamide-diallyldimethylammonium chloride copolymer modified graphene A2.

Example 3

(1) Preparation of Graphene Oxide 1 g graphite powder is mixed with 0.8 g $NaNO_3$ to obtain a mixture, then in an ice water bath 20 mL concentrated $H_2SO_4$ is added into the mixture and the mixture is stirred, next 3.5 g $KMnO_4$ is added into the obtained mixture and the mixture is stirred at a temperature equal to or lower than 4° C. for 0.5 h for reaction, then the water bath temperature is increased to 45° C. and held at the temperature for 1.5 h for thermostatic reaction, next 50 mL water is added dropwise into the obtained mixture and the water bath temperature is increased to 95° C. and held at the temperature for 3.5 h for further reaction, finally 250 mL water is added to dilute the mixture, 4.5 mL $H_2O_2$ and 250 mL 4 wt % hydrochloric acid are added into the mixture after the temperature of the mixture drops to 60° C. or lower, and the mixture is stirred for 50 min for reaction, the reaction product is washed with water by centrifugal washing till the pH of the solution is neutral after the reaction is finished, and then the reaction product is dried by vacuum drying at 40° C., to obtain graphene oxide.

(2) Preparation of Modified Graphene 0.03 g graphene oxide obtained above is dispersed by ultrasonic dispersion in water to prepare 0.5 mg/mL dispersion; 28 mL 0.52 wt % solution of acrylamide-diallyldimethylammonium chloride copolymer (the number-average molecular weight is 18,000, and the molar ratio of structural unit provided by acrylamide to structural units provided by diallyldimethylammonium chloride is 1:8) is added into the dispersion, the obtained mixture is stirred for 50 min, and then 1.9 mL hydrazine hydrate is added into the mixture, and the mixture is kept in a constant temperature water bath of 65° C. for 10 h for reaction. The reaction product is separated by centrifugal separation, washed with water, and then dried by vacuum drying at 65° C., to obtain acrylamide-diallyldimethylammonium chloride copolymer modified graphene A3.

Comparative Example 1

Modified graphene is prepared according to the method described in the example 1, except that the dispersion is prepared by mixing graphene oxide with water and stirring the mixture without ultrasonic dispersion in the step (2); thus, acrylamide-diallyldimethylammonium chloride copolymer modified graphene D1 is obtained.

Comparative Example 2

Modified graphene is prepared according to the method described in the example 1, except that hydrazine hydrate is not added in the step (2); thus, acrylamide-diallyldimethylammonium chloride copolymer modified graphene D2 is obtained.

Comparative Example 3

Modified graphene is prepared according to the method described in the example 1, except that 30 mL 0.5 wt % solution of diallyldimethylammonium chloride polymer (the number-average molecular weight is 20,000) is used to replace the solution of acrylamide-diallyldimethylammonium chloride copolymer in the step (2); thus, diallyldimethylammonium chloride polymer modified graphene D3 is obtained.

Comparative Example 4

Modified graphene is prepared according to the method described in the example 1, except that 30 mL 0.5 wt % solution of polyacrylamide (the number-average molecular weight is 20,000) is used to replace the solution of acrylamide-diallyldimethylammonium chloride copolymer in the step (2); thus, polyacrylamide modified graphene D4 is obtained.

Comparative Example 5

Modified graphene is prepared according to the method described in the example 1, except that the number-average molecular weight of the acrylamide-diallyldimethylammonium chloride copolymer used in the step (2) is 35,000; thus, acrylamide-diallyldimethylammonium chloride copolymer modified graphene D5 is obtained.

Comparative Example 6

Modified graphene is prepared according to the method described in the example 1, except that the number-average molecular weight of the acrylamide-diallyldimethylammonium chloride copolymer used in the step (2) is 12,000; thus, acrylamide-diallyldimethylammonium chloride copolymer modified graphene D6 is obtained.

Comparative Example 7

Modified graphene is prepared according to the method described in the example 1, except that the molar ratio of structural units provided by acrylamide to structural units provided by diallyldimethylammonium chloride in the acrylamide-diallyldimethylammonium chloride copolymer in the step (2) is 1:18; thus, acrylamide-diallyldimethylammonium chloride copolymer modified graphene D7 is obtained.

Comparative Example 8

Modified graphene is prepared according to the method described in the example 1, except that the molar ratio of structural units provided by acrylamide to structural units provided by diallyldimethylammonium chloride in the acrylamide-diallyldimethylammonium chloride copolymer in the step (2) is 1:4; thus, acrylamide-diallyldimethylammonium chloride copolymer modified graphene D8 is obtained.

Applied Example 1

A drilling fluid F1 is prepared according to the following formula: 3% acrylamide-diallyldimethylammonium chloride copolymer modified graphene A1, 2% sodium bentonite, 2% amine inhibitor (from Chengdu Chunfeng Petroleum Technology Co., Ltd.), 3% sulfomethylated phenolic resin (from Chengdu Chunfeng Petroleum Technology Co., Ltd.), 4% polyethylene glycol-4000, 0.5% PAC (polyanionic cellulose from Shandong Yangu Jiangbei Chemical Industry Co., Ltd.), 1% KCl, 0.3% $Na_2CO_3$, and remaining water. The above percentages in the drilling fluid are mass-volume ratios. For example, 3% A1 refers to that 3 g acrylamide-diallyldimethylammonium chloride copolymer modified graphene A1 is added into 100 mL drilling fluid.

Applied Examples 2-3 and Comparative Applied Examples 1-8

Water-based drilling fluids are prepared according to the method described in the applied example 1, except that the modified graphene A1 is replaced with modified graphene A2-A3 and D1-D8 respectively; thus, the water-based drilling fluids F2, F3 and DF1-DF8 are obtained respectively.

Comparative Applied Example 9

A water-based drilling fluid is prepared according to the method described in the applied example 1, except that the acrylamide-diallyldimethylammonium chloride copolymer modified graphene A1 is not added; thus, a water-based drilling fluid DF9 is obtained.

Comparative Applied Example 10

A water-based drilling fluid is prepared according to the method described in the applied example 1, except that the acrylamide-diallyldimethylammonium chloride copolymer modified graphene A1 is replaced with 3% sulfonated lignite resin (trademark SPNH from Chengdu Chunfeng Petroleum Technology Co., Ltd.); thus, a water-based drilling fluid DF10 is obtained.

Test Case 1

The above-mentioned water-based drilling fluids F1-F3 and DF1-DF10 are sampled in 400 mL volume respectively, 1.0 wt % $CaCl_2$ is added into each of the water-based drilling fluids; each drilling fluid is stirred for 20 min at 5,000 rpm, and then is loaded into an aging can, the aging can is loaded into a roller hearth, and is rolled for 16 h at a constant temperature of 200° C.; then, the aging can is taken out from the roller hearth and cooled to room temperature; next, the drilling fluid is stirred for 20 min at 5,000 rpm again, and then the apparent viscosity (AV, mPa·s), plastic viscosity (PV, mPa·s), yield point (YP, Pa), API filtrate loss at medium pressure (FLAPI, mL), and filtrate loss at high temperature and high pressure (FLHTHP, mL, 200° C.) of each drilling fluid are measured respectively as per GB/T16783.1-2006. The results are shown in Table 1.

TABLE 1

| Drilling Fluid | Test Condition | AV mPa·s | PV mPa·s | YP Pa | $FL_{API}$ mL | $FL_{HTHP}$ mL |
|---|---|---|---|---|---|---|
| F1 | Before aging | 41 | 26 | 15 | 2.8 | — |
|  | After aging | 35 | 24 | 11 | 3.0 | 21.6 |

TABLE 1-continued

| Drilling Fluid | Test Condition | AV mPa·s | PV mPa·s | YP Pa | $FL_{API}$ mL | $FL_{HTHP}$ mL |
|---|---|---|---|---|---|---|
| F2 | Before aging | 40 | 27 | 13 | 3.2 | — |
|  | After aging | 35 | 23 | 12 | 3.4 | 22.4 |
| F3 | Before aging | 40 | 26 | 14 | 3.2 | — |
|  | After aging | 36 | 24 | 12 | 4.0 | 23.0 |
| DF1 | Before aging | 46 | 31 | 15 | 5.8 | — |
|  | After aging | 24 | 18 | 6 | 7.4 | 44.0 |
| DF2 | Before aging | 47 | 34 | 13 | 5.4 | — |
|  | After aging | 23 | 18 | 5 | 6.8 | 43.4 |
| DF3 | Before aging | 39 | 26 | 13 | 4.6 | — |
|  | After aging | 32 | 21 | 11 | 5.8 | 38.2 |
| DF4 | Before aging | 44 | 30 | 14 | 4.2 | — |
|  | After aging | 30 | 21 | 9 | 5.6 | 37.6 |
| DF5 | Before aging | 43 | 29 | 14 | 3.6 | — |
|  | After aging | 35 | 23 | 12 | 5.0 | 32.2 |
| DF6 | Before aging | 43 | 28 | 15 | 3.4 | — |
|  | After aging | 36 | 24 | 12 | 4.8 | 29.6 |
| DF7 | Before aging | 40 | 27 | 13 | 3.4 | — |
|  | After aging | 34 | 23 | 11 | 4.6 | 29.4 |
| DF8 | Before aging | 43 | 30 | 13 | 3.6 | — |
|  | After aging | 34 | 24 | 10 | 4.8 | 30.8 |
| DF9 | Before aging | 35 | 23 | 12 | 6.0 | — |
|  | After aging | 22 | 15 | 7 | 9.2 | 46.2 |
| DF10 | Before aging | 41 | 27 | 14 | 3.6 | — |
|  | After aging | 34 | 23 | 11 | 5.0 | 33.8 |

It is seen from Table 1: the water-based drilling fluid provided in the present invention still has relatively lower API filtrate loss and lower filtrate loss at high temperature and high pressure under the condition of 1.0 wt % $CaCl_2$, which indicates that the water-based drilling fluid provided in the present invention meets the requirement for high temperature resistance (at 200° C.) under the condition of 1.0 wt % $CaCl_2$.

Test Case 2

The reservoir protection performance of the drilling fluids F1-F3 and DF1-DF10 are tested as per SYT6540-2002 "Lab Testing Method of Drilling and Completion Fluids Damaging Oil Formation" on a JHMD-1 HTHP dynamic filter tester respectively. The results are shown in Table 2, wherein the original permeability values of the well cores used in the test are the Initial Values in Table 2.

TABLE 2

| Drilling Fluid | Well Core No. | Oleic Permeability/$10^{-3}$ $\mu m^2$ | | Plugging Ratio/% | Permeability Recovery Rate/% | |
|---|---|---|---|---|---|---|
| | | Initial Value | After Plugging | | After Damage | After End Face Cutting |
| F1 | 1 | 267.8 | 1.9 | 99.3 | 92.5 | 98.6 |
| F2 | 2 | 273.2 | 3.6 | 98.7 | 91.6 | 98.0 |
| F3 | 3 | 261.5 | 3.7 | 98.6 | 91.3 | 97.4 |
| DF1 | 4 | 265.9 | 14.3 | 94.6 | 83.3 | 90.2 |
| DF2 | 5 | 272.4 | 15.8 | 94.2 | 83.2 | 90.4 |
| DF3 | 6 | 268.9 | 22.9 | 91.5 | 86.2 | 91.4 |
| DF4 | 7 | 263.2 | 20.5 | 92.2 | 86.0 | 92.3 |
| DF5 | 8 | 270.3 | 16.5 | 93.9 | 86.1 | 92.7 |
| DF6 | 9 | 268.3 | 14.0 | 94.8 | 86.4 | 94.6 |
| DF7 | 10 | 261.7 | 14.4 | 94.5 | 86.8 | 94.8 |
| DF8 | 11 | 271.9 | 15.5 | 94.3 | 86.3 | 93.2 |
| DF9 | 12 | 274.6 | 50.8 | 81.5 | 82.6 | 89.6 |
| DF10 | 13 | 270.9 | 22.8 | 91.6 | 80.4 | 85.4 |

It is seen from the data in Table 2: after the plugging agent for temperature-resistant calcium-resistant water-based drilling used in oil and gas reservoir protection provided in the present invention is added into the drilling fluid, the drilling fluid attains a much better reservoir plugging effect and obtains higher permeability recovery capability, wherein, the plugging ratio may be 98% or above, preferably 99% or above, apparently higher than the plugging ratio (94.8%) of the same drilling fluid without the plugging agent provided in the present invention; in addition, the permeability recovery ratio may be 91% or above, preferably 92% or above, apparently higher than the permeability recovery ratio (86.8%) of the same water-based drilling fluid without the plugging agent for temperature-resistant calcium-resistant water-based drilling fluid used in oil and gas reservoir protection provided in the present invention.

While some preferred embodiments of the present invention are described above, the present invention is not limited to the specific details in those embodiments. Those skilled in the art can make various simple modifications and variations to the technical scheme of the present invention within the scope of the technical concept of the present invention. However, all those modifications and variations shall be deemed as falling into the scope of protection of the present invention.

In addition, it should be noted that the specific technical features described in above specific embodiments may be combined in any appropriate form, provided that there is no conflict among them. To avoid unnecessary repetition, various possible combinations are not described specifically in the present invention.

Moreover, different embodiments of the present invention may also be combined freely as required, as long as the combinations don't deviate from the ideal and spirit of the present invention. However, such combinations shall also be deemed as falling into the scope disclosed in the present invention.

The invention claimed is:

1. A method for preparing acrylamide-diallyldimethylammonium chloride copolymer modified graphene comprising: dispersing graphene oxide by ultrasonic dispersion in water to obtain a dispersion, and making the dispersion to react with acrylamide-diallyldimethylammonium chloride copolymer and hydrazine hydrate, wherein in the acrylamide-diallyldimethylammonium chloride copolymer, a molar ratio of structural units provided by acrylamide to structural units provided by diallyldimethylammonium chloride is 1:5-15; a number-average molecular weight of the acrylamide-diallyldimethylammonium chloride copolymer is 15,000-30,000, wherein a weight ratio of the graphene oxide to the acrylamide-diallyldimethylammonium chloride copolymer to the hydrazine hydrate is 1:4.8-5.3:60-80.

2. The method according to claim 1, wherein the molar ratio of structural units provided by acrylamide to structural units provided by diallyldimethylammonium chloride is 1:8-10.

3. The method according to claim 1, wherein the number-average molecular weight of the acrylamide-diallyldimethylammonium chloride copolymer is 18,000-25,000.

4. The method according to claim 1, wherein the weight ratio of the graphene oxide to the acrylamide-diallyldimethylammonium chloride copolymer to the hydrazine hydrate is 1:4.9-5.2:65-76.

5. The method according to claim 1, wherein a concentration of the graphene oxide in the dispersion is 0.5-2.2 mg/mL.

6. The method according to claim 1, wherein the acrylamide-diallyldimethylammonium chloride copolymer is added in a form of solution, and a concentration of the acrylamide-diallyldimethylammonium chloride copolymer solution is 0.4-0.6 wt %.

7. The method according to claim 1, wherein a process of a reaction comprises: firstly adding the acrylamide-diallyldimethylammonium chloride copolymer in a form of solution into the dispersion and stirring for 15-50 min, and then adding the hydrazine hydrate to obtain a mixture, and keeping the mixture in a constant temperature water bath of 65-95° C. to react for 1-10 h.

8. The method according to claim 1, further comprising: preparing graphene oxide according to the following procedures:

mixing graphite powder with $NaNO_3$ to obtain a mixture, then in an ice water bath adding concentrated $H_2SO_4$ into the mixture and stirring, next adding $KMnO_4$ into the obtained mixture and stirring at a temperature equal to or lower than 4° C. for reaction, then increasing a water bath temperature to 30-45° C. and holding at the temperature for a thermostatic reaction, next adding water dropwise into the obtained mixture and increasing the water bath temperature to 90-100° C. for further reaction, finally adding water to dilute the mixture, adding $H_2O_2$ and hydrochloric acid into the mixture after a temperature of the mixture drops to 60° C. or lower, and stirring for reaction, washing a reaction product with water by centrifugal washing till a pH of the solution is neutral after the reaction is finished, and then drying the reaction product.

9. The method according to claim 8, wherein a mass ratio of the $KMnO_4$ to the $NaNO_3$ to the graphite powder is 2.8-3.5:0.8-1.3:1.

10. The method according to claim 9, wherein the mass ratio of the $KMnO_4$ to the $NaNO_3$ to the graphite powder is 2.9-3.3:0.9-1.2:1.

11. The method according to claim 8, wherein a dose ratio of the graphite powder to the concentrated $H_2SO_4$ is 1 g:20-27.5 mL.

12. The method according to claim 11, wherein the dose ratio of the graphite powder to the concentrated $H_2SO_4$ is 1 g:21.5-26.5 mL.

13. The method according to claim 11, wherein the dose ratio of the graphite powder to the $H_2O_2$ is 1 g:4.5-5.6 mL.

14. The method according to claim 13, wherein the dose ratio of the graphite powder to the $H_2O_2$ is 1 g:4.8-5.5 mL.

15. An acrylamide-diallyldimethylammonium chloride copolymer modified graphene prepared with the method according to any one of claim 1.

16. A use of the acrylamide-diallyldimethylammonium chloride copolymer modified graphene according to claim 15 as a plugging agent used in a water-based drilling fluid.

17. A water-based drilling fluid containing the acrylamide-diallyldimethylammonium chloride copolymer modified graphene according to claim 15 as a plugging agent.

18. The water-based drilling fluid according to claim 17, wherein, in the water-based drilling fluid, a content of the acrylamide-diallyldimethylammonium chloride copolymer modified graphene is 0.3-3 wt %.

19. A use of the water-based drilling fluid according to claim 17 in well drilling in a high-temperature high-calcium oil and gas reservoir.

* * * * *